UNITED STATES PATENT OFFICE.

JOSEPH DUKE, OF GLASTONBURY, COUNTY OF SOMERSET, ENGLAND, ASSIGNOR TO HENRY SYMONS.

COMPOSITION FOR PURIFYING GAS.

SPECIFICATION forming part of Letters Patent No. 316,609, dated April 28, 1885.

Application filed May 24, 1884. (No specimens.) Patented in England June 23, 1882, No. 2,981.

*To all whom it may concern:*

Be it known that I, JOSEPH DUKE, of Glastonbury, in the county of Somerset, England, have invented certain new and useful Improvements in Compositions for Purifying Gas, of which the following is a specification.

My invention consists in a composition for use in the purification of gas, composed of monocalcic phosphate, sulphate of lime, and charcoal or pulverized peat.

In carrying my invention into effect I take phosphate of lime in any convenient form and treat it with hydrochloric acid, in the proportion, roughly speaking, of one-third acid to two-thirds phosphate of lime, the lime being held in solution in, but chemically separated from, the phosphoric acid. The proportion of acid necessary will vary according to the amount of lime contained in the phosphate. I then add a sufficient quantity of sulphuric acid to precipitate the lime and to render soluble any insoluble phosphate of lime that may not have been acted upon, and I thus leave the phosphoric acid partly free, obtaining the monocalcic phosphate. This is a convenient and simple method of producing the monocalcic phosphate; but it may be made in other well-known ways. I then mix the monocalcic phosphate and the precipitated sulphate of lime derived from the above process with peat-charcoal or dried pulverized peat, or other suitable porous material, and charge a purifier with the composition, preferably in a damp state, passing through it the gas as it comes from the condensers or other parts of the works. After this has been done the gas is passed through the ordinary lime or oxide-of-iron purifier. The gas may also be passed with advantage through the composition of monocalcic phosphate, sulphate of lime, and peat-charcoal or pulverized peat after it has gone through the ordinary lime or oxide-of-iron purifier; or the gas may be purified by being passed first through the composition above described, next through the lime or oxide-of-iron purifier, and again through a fresh mass of the said composition.

When the composition in the purifier is highly charged with the ammonia, which will cause the phosphoric acid to be wholly or in part precipitated, the composition of peat-charcoal and peat or other porous substance and phosphoric acid and lime must be removed, and is then available as a valuable base for a fertilizing composition or manure. Should, however, any of the soluble phosphate be precipitated, sulphuric acid is to be added to render the precipitated phosphate soluble.

This composition may be used as it comes from the purifier, or may be reduced or increased by the addition of phosphates or phosphates rendered soluble, or of other ingredients to suit different crops.

What I claim as my invention, and desire to secure by Letters Patent, is—

The composition herein described for purifying gas, composed of monocalcic phosphate, sulphate of lime, and charcoal or pulverized peat, substantially as set forth.

JOSEPH DUKE.

Witnesses:
    ARTHUR H. WANSEY,
       *Notary Public, Bristol.*
    THOMAS JARRETT,
       *His Clerk.*